(No Model.) 2 Sheets—Sheet 1.

T. A. DAVIES.
VELOCIPEDE.

No. 276,786. Patented May 1, 1883.

WITNESSES:

INVENTOR:
T. A. Davies
BY Munn & Co.
ATTORNEYS.

(No Model.) 2 Sheets—Sheet 2.
T. A. DAVIES.
VELOCIPEDE.
No. 276,786. Patented May 1, 1883.
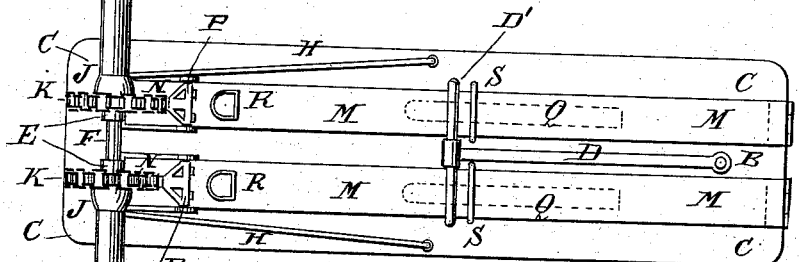
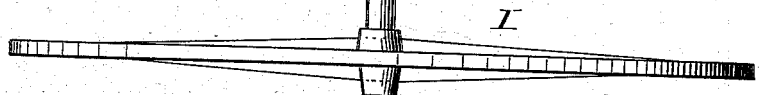
Fig. 3.
Fig. 6.
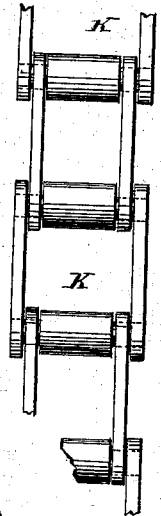
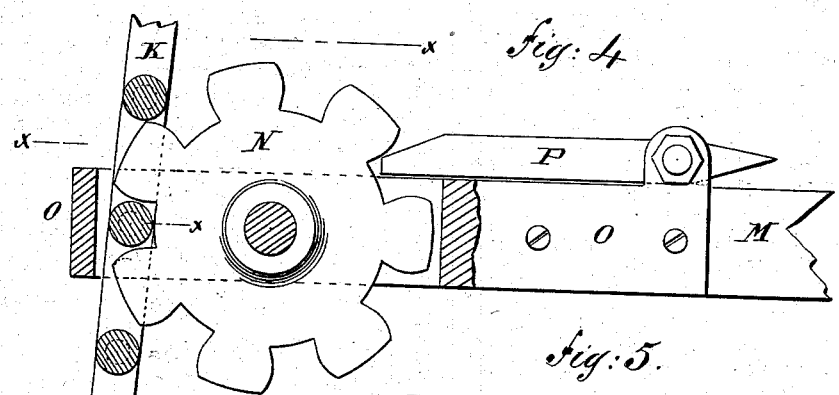
Fig. 4.
Fig. 5.
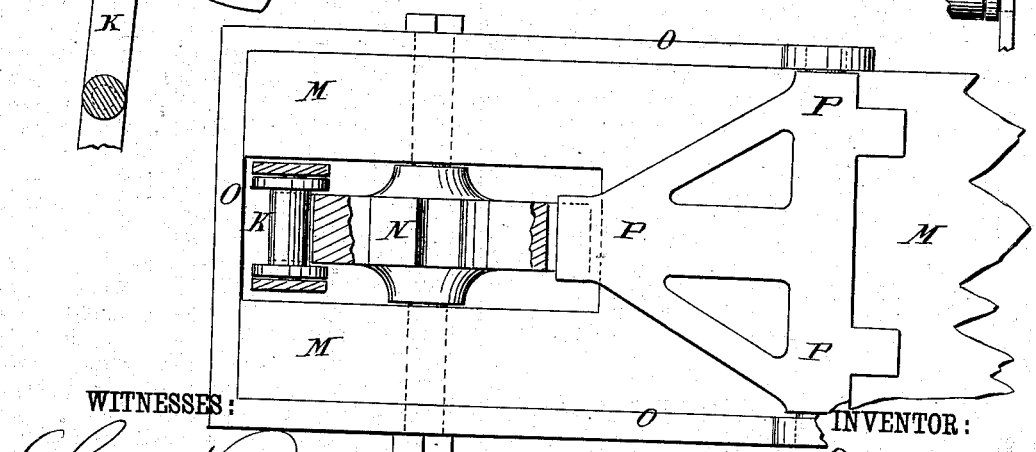
WITNESSES: Chas. Nida, C. Sedgwick
INVENTOR: T. A. Davies
BY Munn & Co.
ATTORNEYS.
N. PETERS. Photo-Lithographer, Washington, D. C.

UNITED STATES PATENT OFFICE.

THOMAS A. DAVIES, OF NEW YORK, N. Y.

VELOCIPEDE.

SPECIFICATION forming part of Letters Patent No. 276,786, dated May 1, 1883.

Application filed January 19, 1883. (No model.)

*To all whom it may concern:*

Be it known that I, THOMAS A. DAVIES, of the city, county, and State of New York, have invented a new and useful Improvement in Foot-Power Vehicles, of which the following is a full, clear, and exact description.

Reference is to be had to the accompanying drawings, forming a part of this specification, in which similar letters of reference indicate corresponding parts in all the figures.

Figure 1:
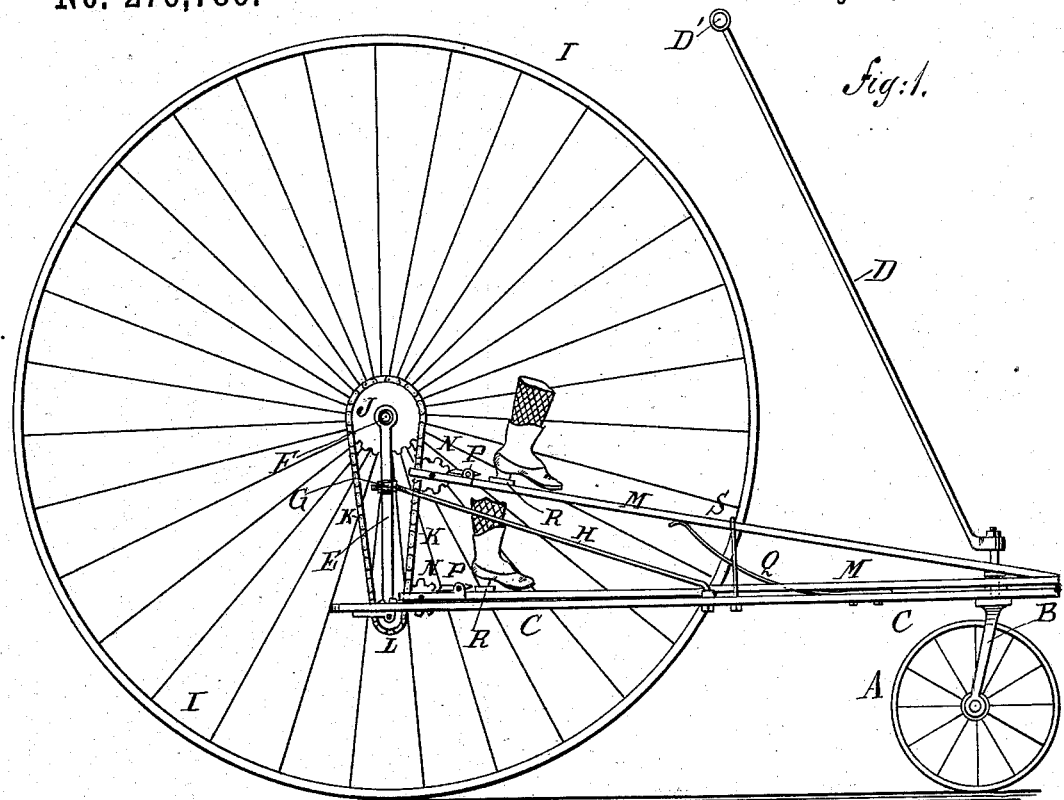
Figure 2:
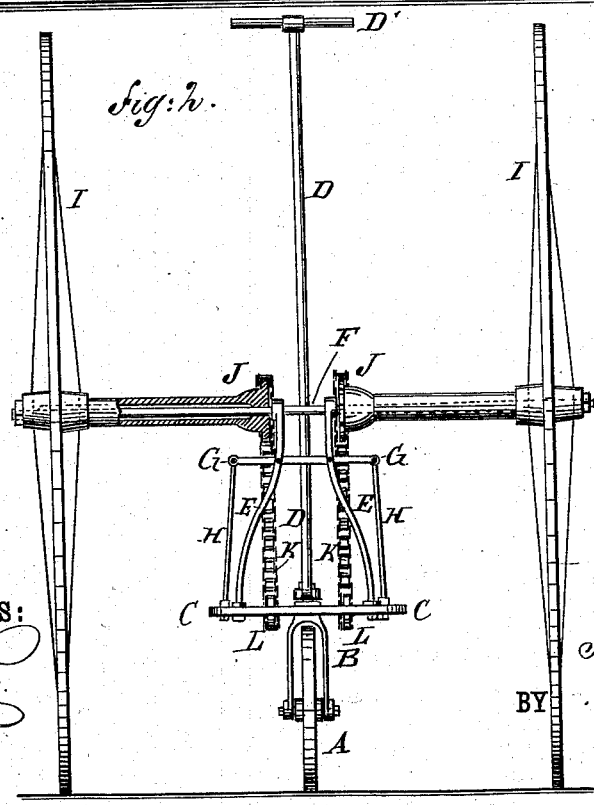

Figure 1, Sheet 1, is a side elevation of my improvement. Fig. 2, Sheet 1, is a rear elevation of the same, part being broken away. Fig. 3, Sheet 2, is a plan view of the same. Fig. 4, Sheet 2, is a side elevation, partly in section, of one of the treadles and a portion of an endless chain. Fig. 5, Sheet 2, is a plan view of the same, partly in section through the broken line $x\ x\ x$, Fig. 4, and part being broken away. Fig. 6, Sheet 2, is a plan view of a portion of an endless chain.

The object of this invention is to promote efficiency in operating tricycles, bicycles, and four-wheeled vehicles.

The invention consists in a tricycle, or other foot-power vehicle, constructed with drive-wheels upon the ends of its hubs, around which pass endless chains operated by treadles hinged to a platform suspended from the axle of the drive-wheels. In the slotted rear ends of the treadles are pivoted gear-wheels to engage with the endless chains, and which are held from turning, when the said treadles are moving downward, by latches hinged to the said treadles, and arranged to allow the said gear-wheels to turn freely when the treadles are moving upward. The treadles are raised automatically, after being pressed down, by springs pressing against their lower sides and attached to the suspended platform. The platform is firmly secured and supported in place by standards, a cross-bar, and braces connected with the said platform and the axle of the drive-wheels, as will be hereinafter fully described.

I will describe my improvement as applied to tricycles, but do not limit myself to that use, as it can be applied with equal advantage to bicycles and four-wheeled vehicles.

A represents the forward wheel of the tricycle, the slotted standard B of which is swiveled to the forward end of the platform C, and has a guide-rod, D, attached to its upper end. The upper end of the guide-rod D has an eye formed in it to receive the cross-bar D', which serves as a handle in guiding the vehicle.

To the rear end of the platform C are attached the lower ends of two standards, E, the upper ends of which have bearings formed in them to receive the axle F. The standards E are strengthened and greater firmness is given to the connection between the said standards and the platform C by the cross-bar G and the braces H. The cross-bar G is attached to the standards E, near their upper ends, and through eyes in its projecting ends are passed the rear ends of the braces H, which have nuts screwed upon them, one upon each side of each end of the cross-bar G, so that the drive-wheels can be trued by adjusting the said nuts. The forward ends of the braces H are attached to the middle part of the platform C, near its side edges.

I are the drive-wheels, the hubs of which are placed upon the axle F, and are made long at the inner sides of the said wheels I, so as to extend to or nearly to the upper ends of the standards E.

Upon the inner ends of the hubs of the wheels I are formed, or to them are attached, chain-wheels J, around which pass two endless chains, K. The chains K can be formed of links connected at their adjacent ends by rivets or bolts, as shown in Fig. 6, or in any other suitable manner. The endless chains K also pass around guide-pulleys L, pivoted in slots in the rear end of the platform C, to keep the said chains straight and in proper positions to pass over the chain-wheels J.

To the forward end of the platform C are hinged the forward ends of two treadles, M, the rear ends of which are slotted to receive the forward parts of the endless chains K and the gear-wheels N. The teeth of the gear-wheels N are so formed as to engage with the endless chains K, and the said chains are held in gear with the said wheels by the metal straps O, which pass around the ends of the said treadles and are secured to their side edges by screws, as shown in Figs. 4 and 5.

To lugs formed upon the upper edges of the ends of the straps O are hinged the forward parts of latches P, the rear ends of which engage with the teeth of the gear-wheels N. The forward ends of the latches P project a little beyond the axial line of the hinges of the said latches, and are beveled upon their lower sides to come in contact with the treadles M and prevent the rear ends of the said latches from being raised too high. The rear ends of the treadles M are raised, after being pressed down, by springs Q, which press against their lower sides, and which are attached to the platform C, as shown in Fig. 1, and in dotted lines in Fig. 3.

To the rear parts of the treadles M are attached plates R, to receive the heels of the operator and prevent his feet from slipping upon the said treadles.

The treadles M are kept from being raised too high by the pressure of the springs Q by keepers S, attached to the platform C, and through which the said treadles pass.

In using the vehicle the operator stands upon the rear parts of the treadles M, and works the said treadles by throwing his weight upon them alternately. As each treadle moves downward the latch P prevents the gear-wheel N from turning, and causes the said gear-wheel to carry the endless chain K with it in its downward movement, and thus gives motion to the drive-wheels. As each treadle moves upward the latch P rises and allows the gear-wheel to turn freely, so as not to interfere with the downward movement of its chain as the said chain is moved by the advance of the vehicle.

Having thus described my invention, I claim as new and desire to secure by Letters Patent—

1. In a foot-power vehicle, the combination, with drive-wheels provided with chain-wheels on the inner ends of their hubs and endless chains passing around said chain-wheels, and guide-pulleys in the frame, of treadles adapted to engage with the said endless chains to operate them, substantially as herein shown and described.

2. In a foot-power vehicle, the combination, with the drive-wheels I, having chain-wheels J on the inner ends of their hubs, and the suspended platform C, provided with guide-pulleys L, of the endless chains K, the treadles M, provided with the gear-wheels N, and springs Q, substantially as herein shown and described.

3. In a foot-power vehicle, the combination, with the endless chains K and the treadles M, of the gear-wheels N and the hinged latches P, substantially as herein shown and described, whereby the said treadles are made to carry the said endless chains with them in their downward movement, and are allowed to move upward without affecting the said chains, as set forth.

4. In a foot-power vehicle, the combination, with the drive-wheels I, the axle F, and the suspended platform C, of the standards E, the cross-bar G, secured to the said standards, and provided with eyes in its ends, and the braces H, passed through the eyes of the cross-bar, and provided with nuts on each side thereof, substantially as herein shown and described.

THOMAS A. DAVIES.

Witnesses:
JAMES T. GRAHAM,
EDGAR TATE.